US006757305B1

(12) United States Patent
Soepenberg et al.

(10) Patent No.: US 6,757,305 B1
(45) Date of Patent: Jun. 29, 2004

(54) TRANSMISSION SYSTEM

(75) Inventors: Gerrit H. Soepenberg, Eindhoven (NL); Ronald M. Tol, Eindhoven (NL); Edwin A. Montie, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/329,392

(22) Filed: Jun. 10, 1999

(30) Foreign Application Priority Data

Jun. 12, 1998 (EP) ............................................. 98201974

(51) Int. Cl.[7] ............................................. H04L 12/56
(52) U.S. Cl. ................................... 370/536; 370/542
(58) Field of Search ............................... 711/113, 118; 725/39, 136, 138, 142, 140, 139, 134, 100, 89, 131; 370/536, 532, 535

(56) References Cited

U.S. PATENT DOCUMENTS

| 5,161,194 A | * | 11/1992 | Ujiie | |
| 5,303,234 A | * | 4/1994 | Kou | |
| 5,418,782 A | | 5/1995 | Wasilewski | 370/73 |
| 5,594,492 A | | 1/1997 | O'Callaghan et al. | 348/1 |
| 5,614,940 A | | 3/1997 | Cobbley et al. | 348/7 |
| 5,708,961 A | * | 1/1998 | Hylton et al. | |
| 5,875,292 A | * | 2/1999 | Taketsugu | |
| 5,949,792 A | * | 9/1999 | Yasuda et al. | |
| 6,047,317 A | * | 4/2000 | Bisdikian et al. | 709/217 |
| 6,163,539 A | * | 12/2000 | Alexander et al. | |
| 6,169,750 B1 | * | 1/2001 | Tomono et al. | |
| 6,177,930 B1 | * | 1/2001 | Chernock et al. | 345/327 |
| 6,414,972 B1 | * | 7/2002 | Hagai et al. | 370/532 |
| 6,427,238 B1 | * | 7/2002 | Goodman et al. | 725/136 |
| 6,530,082 B1 | * | 3/2003 | Del Sesto et al. | 725/9 |

FOREIGN PATENT DOCUMENTS

EP          0827340 A2    3/1998 .......... H04N/7/173

* cited by examiner

Primary Examiner—Kenneth Vanderpuye
(74) Attorney, Agent, or Firm—Laurie E. Gathman

(57) ABSTRACT

The transmission system comprises a transmitter (10) and a receiver (14). The transmitter (10) can transmit a number of multiplex signals (12) to the receiver (14). The receiver (14) comprises storage means (20) for storing data sections included in the multiplex signals (12) in dependence on information present in the multiplex signals (12). The information for the complete set of multiplex signals (12) is contained in a single information section in at least one of the multiplex signals (12).

20 Claims, 1 Drawing Sheet

TRANSMISSION SYSTEM

FIELD OF THE INVENTION

The invention relates to a transmission system for transmitting a multiplex signal from a transmitter to a receiver, said receiver comprising storage means for storing data sections included in the multiplex signal in dependence on information present in the multiplex signal.

The invention further relates to a transmitter for transmitting a plurality of multiplex signals, a receiver for receiving a multiplex signal, storage means for storing data sections included in a multiplex signal and a multiplex signal comprising data sections and therewith corresponding storage information.

DESCRIPTION OF THE RELATED ART

A transmission system according to the preamble is known from EP-A 0 827 340. In modem digital broadcast systems a transmitter, e.g. a headend, typically transmits a large number of services (or channels) to a plurality of receivers, like for instance television sets or set-top boxes. Such a service can contain an audio/video stream, an interactive application (for example in the MHEG-5 format), other kinds of data or a combination of these elements. An MPEG-2 transport stream is a multiplex of a number of services. Typically, a transmitter transmits several transport streams to the set-top boxes. A set-top box can tune to a specific transport stream and is then able to retrieve information from the transport stream. Such a set-top box typically has only one tuner and is thus merely able to receive one single transport stream at a time. When a user wants to look at a television program, or wants to run an interactive application, or wants to access other kinds of data the set-top box or television set tunes to the corresponding transport stream and retrieves and processes the required data from the service as it is being broadcast at that moment.

Interactive applications, like for instance tele-banking, tele-shopping or an electronic newspaper are typically broadcast in a carousel-like fashion, i.e. the therewith corresponding data sections are repeated periodically in the transport stream. For instance, both DVB and DAVIC have specified DSM-CC object carousels for broadcasting interactive applications. The response time of this kind of applications can be improved considerably by applying some kind of caching in the set-top box, i.e. storing data sections in the set-top box which may have to be accessed in the future. Otherwise, if caching is not used and the set-top box wants to retrieve a part of the interactive application, the set-top box must wait until that particular part is broadcast again, In order to be able to cache data, the set-top box must have access to a storage device like for instance a hard disk. The set-top box can also use this storage device to store linear television content, like for instance short news bulletins or weather forecasts. These programs can be viewed by the user whenever this is convenient.

Not all information is equally important to cache. So, in order for a set-top box to be able to decide on what data to cache, it should know the relative cache priorities of cacheable data. A service provider may want to set these cache priorities and broadcast them to the set-top boxes.

In the known transmission system a transport stream is broadcast by a transmitter to a number of receivers. This transport stream comprises a number of services which are embedded into a single interactive application. The transport stream further comprises cache priorities for data sections corresponding with the application and the services. These cache priorities can be used by the receivers to cache the data sections so that a desired piece of image information is displayed immediately upon a request of a user.

SUMMARY OF THE INVENTION

An object of the invention is to provide a transmission system, wherein the receiver or set-top box is able to efficiently handle the caching of a plurality of services, which services are not embedded into a single application. This object is achieved in the transmission system according to the invention, which is characterized in that the information for the multiplex signal is contained in a single information section. By concentrating the cache priorities for all services included in the transport stream into a single information section, e.g. a DVB SI table, the set-top box can quickly get a complete view of all cacheable data included in the transport stream by simply reading this information section.

An embodiment of the transmission system according to the invention is characterized in that the transmission system is embodied so as to transmit at least one further multiplex signal from the transmitter to the receiver, whereby the information section also contains the information for the further multiplex signal. By concentrating the cache priorities for all services included in a plurality of transport streams transmitted by the transmitter into a single information section, the set-top box can quickly get a complete view of all cacheable data included in these transport streams simply by reading this information section. In this way, there is no need for the set-top box to tune to all the transport streams sequentially in order to obtain a complete overview of the cache priorities. It suffices to only tune to a transport stream which includes the complete overview in a single information section.

BRIEF DESCRIPTION OF THE DRAWINGS

The above object and features of the present invention will be more apparent from the following description of the preferred embodiments with reference to the drawing, wherein.

DESCRIPTION OF THE PREFERRED EMBODIMENTS

Figure 1:
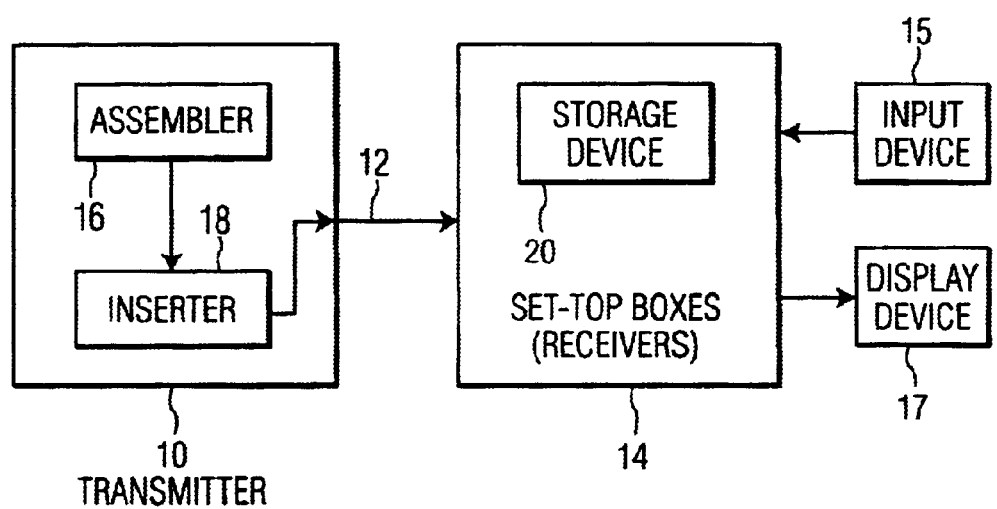
FIG. 1 shows a block diagram of a transmission system according to the invention.

FIG. 1 shows a block diagram of a transmission system according to the invention. In such a transmission system a number of multiplex signals 12 are transmitted by a transmitter 10 to a receiver 14. The transmission system may comprise further receivers 14. The transmission system according to the invention can be used in a cable television (CATV) network environment, whereby the transmitter 10 comprises the headend of the CATV network and the receivers 14 comprise the set-top boxes or television sets of the end-users. The end-users are able to control a receiver 14 by means of a input device 15, like for instance a keyboard or a remote control. The end-users can view the selected services on a display device 17.

The multiplex signals 12 can be implemented in the form of MPEG-2 transport streams. An MPEG-2 transport stream is a multiplex of a number of so-called services. Such a service can contain an audio/video stream, an interactive application (for example in the MHEG-5 format), other kinds of data or a combination of these elements. Typically, a headend 10 transmits several transport streams 12 to the set-top boxes 14. In this way, a large number of services (or channels) can be broadcast by the headend 10 to a plurality of set-top boxes 14.

A set-top box 14 can tune to a specific transport stream 12 and is then able to retrieve information from the transport stream 12. Such a set-top box 14 typically has only one tuner and is thus merely able to receive a single transport stream 12 at a time. When a user wants to look at a television program, or wants to run an interactive application, or wants to access other kinds of data the set-top box 14 tunes to the corresponding transport stream 12 and retrieves and/or processes the required data from the service as it is being broadcast at that moment.

Interactive applications like for instance tele-banking, tele-shopping or information services are typically broadcast in a carousel-like fashion, i.e. the therewith corresponding data sections are repeated periodically in the transport stream 12. For instance, both DVB and DAVIC have specified DSM-CC object carousels for broadcasting interactive applications. The response time of this kind of applications can be improved considerably by applying some kind of caching in the set-top box 14, i.e. pre-fetching and storing data sections or objects in the set-top box which are likely to be accessed in the future. Otherwise, if pre-fetching and caching is not used and the set-top box 14 wants to retrieve a part of the interactive application, the set-top box 14 must wait until that particular part is broadcast again. In order to be able to cache data, the set-top box 14 must have access to a storage device 20 like for instance a hard disk. The set-top box 14 can also use this storage device 20 to store linear television content, like for instance short news bulletins or weather forecasts. These programs can be viewed by the user whenever this is convenient.

Not all information is equally important to cache. So, in order that the set-top box 14 can make a wise decision on what data or linear television content to cache, it should know the relative cache priorities of cacheable data. These cache priorities can for instance be numbers, where a higher number means a higher priority. A service provider may want to set and broadcast the cache priorities. An obvious way to provide the cache priorities is to include them in the Service Information (SI) tables/descriptors that describe cacheable data. For example, an Event Information Table could indicate the cache priority of each individual event, or the descriptor announcing an interactive application could indicate with which priority the application should be cached. There is, however, a problem with providing cache priorities this way. If a set-top box 14 wants to be sensitive to the cache priorities determined by the service provider and thus cache only those data and linear television contents that have a high enough priority, then the set-top box 14 must have a complete view of all cacheable data and linear television contents and their associated cache priorities. Without such a complete view, the set-top box 14 may miss cacheable data that it would have cached if it had known about it. The problem is that the set-top box must scan all tables/descriptors that can contain a cache priority, in all transport streams 12, in order to get this complete view. This is a tedious way to obtain the cache priorities, because it requires sequential tuning to all transport streams and the parsing of all the potentially interesting tables/descriptors. A way to circumvent this problem is to provide a SI table or descriptor that lists all cacheable data to which a service provider has assigned a cache priority. The scope of such a table/descriptor can be a transport stream or a plurality of transport streams like for instance a network. An item in the list is for instance a record comprising a pointer to cacheable data-field, a cache priority-field and an info on required storage-field. The pointer to the cacheable data can for instance be the SI identification of a service event ("television program") or an identification of where to find an interactive application or other kind of data. The information on the required storage gives an indication on how much storage the set-top box 14 needs, to cache all the cacheable data that is pointed to by the first element in the record. By using the transport stream-wide or network-wide table/descriptor, the set-top box 14 can quickly get a complete view of all the cacheable data. For each transport stream/network, it simply parses a single SI table/descriptor, and it combines the results. The required bandwidth for broadcasting the table/descriptor can be low, i.e. the table only needs to be broadcast occasionally. The set-top box does not need instant access to the table/descriptor, because an access latency does not affect the performance of a direct interaction with the end-user.

For the purpose of including the cache priority table/descriptor the headend 10 comprises assembly means 16 and insertion means 18. In the assembly means 16 all cache priorities corresponding with the services included in the transport stream(s) transmitted by the headend are assembled in a single table/descriptor, which table/descriptor is inserted by the insertion means 18 into at least one of these transport streams.

The transport stream-wide or network-wide cache priority information can for instance be included in the form of descriptors in the Transport Stream Description Table as defined in ISO/IEC International Standard 13818-1, "Information technology—Generic coding of moving pictures and associated audio information: Systems". Another possibility is to define a new DVB SI table in which this cache priority information can be included.

What is claimed is:

1. A transmission system for transmitting a multiplex signal from a transmitter to a receiver, said receiver comprising:

a memory for storing data sections included in the multiplex signal in dependence on caching priority information present in the multiplex signal, wherein the caching priority information for the multiplex signal is contained in a single information section and prioritizes which data sections are to be cached.

2. A transmission system according to claim 1, wherein the transmission system is embodied so as to transmit at least one further multiplex signal from the transmitter to the receiver, whereby the information section also contains caching priority information for the further multiplex signal.

3. A transmitter for transmitting a plurality of multiplex signals, the transmitter comprising:

an insertion device for inserting in the multiplex signals at least one an information section carrying caching priority information about the multiplex signals for prioritizing which data sections in the multiplex signals are to be cached; and an assembler for assembling the information for the plurality of multiplex signals into a single information section.

4. A receiver for receiving a multiplex signal, said receiver comprising:

a storage device for storing data sections included in the multiplex signal in dependence on caching priority information present in the multiplex signal, wherein the caching priority information for the multiplex signal is contained in a single information section and prioritizes which data sections are to be cached.

5. A receiver according to claim 4, wherein the receiver is embodied so as to receive at least one further multiplex signal, whereby the information section also contains caching priority information for the further multiplex signal.

6. A storage device for storing data sections included in a multiplex signal, the storage device being configured to store the data sections in dependence on caching priority information present in the multiplex signal, wherein the information for the multiplex signal is contained in a single information section and prioritizes which data sections are to be cached.

7. A storage device according to claim 6, wherein the storage device is configured to store data sections included in at least one further multiplex signal, whereby the information section also contains caching priority information for the further multiplex signal.

8. A multiplex signal comprising:
  data sections for a plurality of applications;
  storage information for said data sections, said storage information including caching priority information for said applications,
  wherein the storage information for the multiplex signal is contained in a single information section and wherein the caching priority information prioritizes which applications are to be cached.

9. A multiplex signal according to claim 8, wherein the information section also contains the storage information for a further multiplex signal.

10. A transmission system according to claim 1, wherein the single information section comprises a digital video broadcasting service information table.

11. A transmission system according to claim 1, wherein the memory stores data sections of an interactive application included in the multiplex signal.

12. A transmitter according to claim 3, wherein the single information section comprises a digital video broadcasting service information table.

13. A transmitter according to claim 3, wherein the multiplex signals include at least one interactive application, and wherein the insertion device, inserts in the multiplex signals at least one information section carrying caching priority information about the at least one interactive application.

14. A receiver according to claim 4, wherein the single information section comprises a digital video broadcasting service information table.

15. A storage device according to claim 6, wherein the single information section comprises a digital video broadcasting service information table.

16. A multiplex signal according to claim 8, wherein the single information section comprises a digital video broadcasting service information table.

17. A method of retrieving information from a transport stream, said transport stream including at least one interactive application, the method comprising:
  receiving said transport stream;
  storing caching priority information of said at least one interactive application; and
  caching a portion of said transport stream having a priority of at least a minimum caching priority.

18. The method of claim 17, wherein storing caching priority information of said at least one interactive application stores only portions of said transport stream having a priority of at least the minimum caching priority.

19. The method of claim 17, wherein the transport stream includes a digital video broadcasting service information table, said caching priority information being contained in said information table.

20. The method of claim 17, further comprising:
  pre-fetching caching priority information of a future interactive application to be received; and
  storing said caching priority information of the future interactive application to be received.

* * * * *